United States Patent [19]

Hymans

[11] 4,171,173
[45] Oct. 16, 1979

[54] APPARATUS AND METHOD FOR CONNECTING AN END OF A HORIZONTAL BEAM TO A VERTICAL SURFACE OF SUPPORTING STRUCTURE

[76] Inventor: Nelson J. Hymans, 5116 S. 81st St., Ralston, Nebr. 68127

[21] Appl. No.: 925,249

[22] Filed: Jul. 17, 1978

[51] Int. Cl.² .............................................. B25G 3/34
[52] U.S. Cl. ................... 403/189; 403/266; 52/743; 52/289
[58] Field of Search ............... 403/266, 267, 268, 189, 403/381, 407, 13, 14; 52/289, 702, 743, 283, 436

[56] References Cited

U.S. PATENT DOCUMENTS

| | | | |
|---|---|---|---|
| 1,112,995 | 10/1914 | Evans | 52/289 |
| 2,580,174 | 12/1951 | Henderson | 52/289 X |
| 2,934,935 | 5/1960 | Zerna et al. | 403/266 X |
| 3,405,493 | 10/1968 | Omholt | 52/743 X |
| 3,685,866 | 8/1972 | Patenaude | 403/189 |
| 3,979,164 | 9/1976 | Kuchnir | 403/31 X |

*Primary Examiner*—Wayne L. Shedd
*Attorney, Agent, or Firm*—Henderson & Sturm

[57] ABSTRACT

Apparatus and method are disclosed for connecting horizontal beams to vertical surfaces of supporting structures. Two slidingly interconnecting elements are affixed, respectively, to a vertical surface of supporting structure, and an end of a horizontal beam and then positioned for positive stable coupling. The joint created by the elements is filled with grouting to substantially prevent movement of one element relative to the other element.

10 Claims, 8 Drawing Figures

APPARATUS AND METHOD FOR CONNECTING AN END OF A HORIZONTAL BEAM TO A VERTICAL SURFACE OF SUPPORTING STRUCTURE

BACKGROUND OF THE INVENTION

This invention relates generally to method and apparatus useful in building construction, and specifically to such method and apparatus which provide for the connection an end of a horizontal beam to a vertical surface of supporting structure.

The invention to be described herein is directed primarily to the construction of the basic framework of a building. Usually, at least in the commercial building trade, a strong support skeleton is erected to which the floors, walls, siding, etc. are affixed for the completion of a usable structure. Modern support skeletons normally include steel, concrete, or a combination of the two; however, other suitable construction materials are from time to time employed. No matter what specific materials are employed, the rudimentary erection process involves the placement of vertical elements with horizontal elements affixed therebetween for stability.

The prior art has employed a vast number of varying techniques to accomplish skeletal erection. For example, if the construction is to comprise steel columns and beams, the columns are first properly fixed in position and the beam are raised, by crane, to the horizontal position and held there while bolts or rivets are affixed through aligned holes in the flanges of the columns and beams. This process is quite time consuming inasmuch as the number of suitable cranes on any one construction site is very limited, and the fixing procedure must be accomplished by hand while the crane is holding the beam in position. Sometimes, instead of using mechanical fixing means such as bolts or rivets, the beams are welded to the columns. This procedure, too, is very time consuming.

In most precast concrete skeletal structures, the beams, or horizontal elements are generally supported on a horizontal surface of a concrete corbel projecting from the face of a column, or vertical element. Bolting or welding is generally required to complete such connections; and where grout is also required, special external formwork for the grout must be individually fashioned at each joint.

The prior art reveals a wide variety of such connections as each engineer designs the connection for each particular application.

The known prior art connection apparatus and methods are even further difficult to employ because they do not conveniently accomodate ordinary dimensional deviations from planned beam lengths. All concrete structures, including precast concrete beams, shorten as the concrete hardens. The shortening characteristic of concrete beams is not precisely predictable and requires, therefore, some tolerance or accomodation of small deviations from the planned length of a beam. Also, it is necessary to provide some accomodation of ordinary small deviations with regard to the planned position of the supporting column. A need, therefore, exists for an apparatus and method for connecting a beam to a vertical surface of supporting structure which are uniform and easily adapted for specific applications, which do not require welding at the site, which reduce the amount of time required to position and secure the beam, which provide confined spaces for grout within the connection, and which will accomodate ordinary deviations from the planned length of beams and from the planned position of the supporting structure. The present invention is directed to that need.

SUMMARY OF THE INVENTION

One of the objects of this invention is to provide apparatus and method for connecting a beam to a vertical surface of supporting structure which greatly simplify the mechanical and time requirements of building skeletal construction.

Another object of this invention is to provide apparatus and method for connecting a beam to a vertical surface of supporting structure which provide accomodation of ordinary deviations from planned lengths of beams or positions of supporting structure.

Another object of this invention is to provide apparatus and method for connecting a beam to a vertical surface of supporting structure which provide for increased construction speed and safety by mechanically restraining a beam against accidental horizontal and downward movement relative to the supporting structure immediately upon reaching its intended position.

Yet another object of this invention is the provision of an apparatus for connecting a horizontal beam to a vertical surface of supporting structure which provide a mold for receiving joint grout.

It is a further object of this invention to provide an apparatus and a method for connecting an end of a beam to a vertical surface of supporting structure wherein said apparatus and method include confined spaces for grout.

It is also an object of this invention to provide an apparatus and a method for connecting an end of a beam to a vertical surface of supporting structure and therein providing positive mechanical engagement of the end of the beam with the supporting structure under forces which tend to produce displacement of the beam relative to the supporting structure.

It is a still further object of this invention to provide apparatus and method for connecting a beam to a vertical surface of supporting structure which result in a connection which is durable and effective in use, and inexpensive to employ.

BRIEF DESCRIPTION OF THE DRAWINGS

For a better understanding of the invention as well as other objects and further features thereof, reference is made to the following detailed disclosure of the invention taken in conjunction with the accompanying drawings wherein.

DESCRIPTION OF THE PREFERRED EMBODIMENTS

Figure 1:
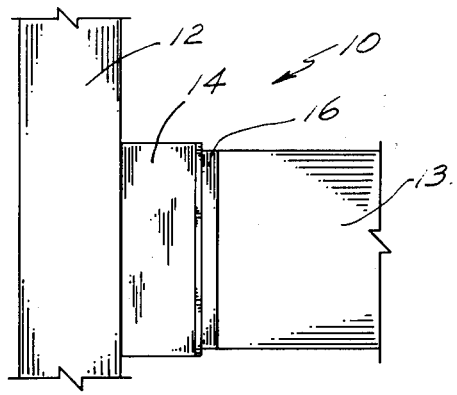
FIG. 1 is a side elevational view of an apparatus made according to the instant invention.

Referring now to FIG. 1, the apparatus of the instant invention 10 can be seen. A horizontal beam 13 has a male bracket 16 affixed thereto which is slidingly received by female bracket 14 which, in turn, is affixed to a vertical surface of column 12. All of the drawings associated with the instant application refer to a horizontal beam and a column; however, it should be realized that the column only exemplifies a supporting structure and is in no way meant to limit the invention to other than the broad category encompassed by the limitation "supporting structure".

Figure 2:
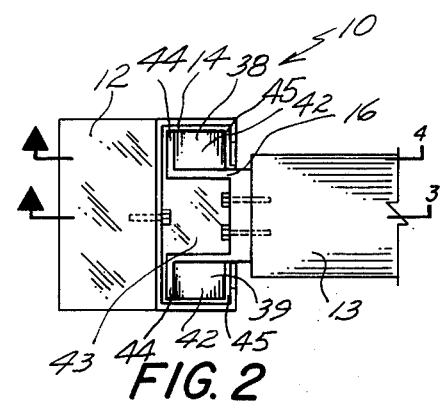
FIG. 2 is a top plan view of FIG. 1 wherein the grout has been left out for ease of description.
Figure 5:
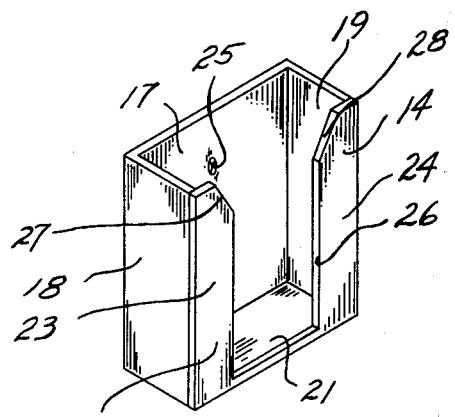
FIG. 5 is an isometric view of the female element of the apparatus shown in FIGS. 1-4.

FIG. 2 is a top plan view of the apparatus 10 and readily shows how the male bracket 16 is slidingly held by female bracket 14. Attention is directed temporarily to FIG. 5 for a description of the female bracket 14. Bracket 14 is a rectangular box-like structure with an open top and a partially open side, and comprising a rear wall 17, opposing side walls 18 and 19, bottom wall 21 and front wall 22. Rear wall 17 is shown with opening means 25 formed therein for receiving fixing means for securing the female bracket to a vertical surface of column 12. Alternative fixing means will be explained further below. The front wall 22 includes two opposing sections 23 and 24 which are centrally spaced apart to form a generally U-shaped opening 26 which extends from the open top of the structure to the bottom wall 21. The upper adjacent edges 27 and 28 of sections 23 and 24 may be slanted an an acute angle to guide the male member into proper position.

Figure 6:
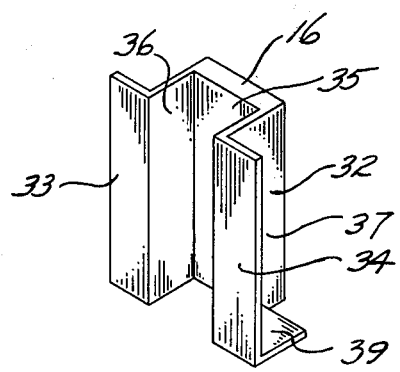
FIG. 6 is an isometric view of the male member of the apparatus shown in FIGS. 1-4.

Referring now to FIG. 6, the male bracket 16 will be described. The male bracket 16 includes a generally U-shaped plate 32 having a pair of coplanar flanges 33 and 34 secured thereto. The plate 32 has a generally flat rectangular base 35 and a pair of parallel walls 36 and 37 secured on one end to the lateral edges of the plate and having a free end projecting perpendicularly therefrom. Affixed to the free end of each wall and disposed parallel to the base 35 is a flange 33 or 34 which projects outwardly of the base. The bracket 16 also includes, as best seen in FIGS. 2 and 6, spacer plates 38 and 39 affixed to at least each of the flanges 33 and 34, respectively. Obviously, the spacer plates 38 and 39 may also be affixed to the adjacent side walls 36 and 37 respectively. Openings 31 are also formed in the base 35 for receiving fixing means for securing the male bracket to the end of beam 13.

Typically, both the male bracket 16 and the female bracket 14 are fabricated of steel with wall thicknesses depending upon the particular application, but generally ⅛ inch to ¾ inch thick. For different applications, materials other than steel, such as plastic or alloys, may be employed and the thickness of the materials will vary.

Brackets 14 and 16 may be affixed to the beam 13 and vertical surface 12 in any suitable manner. For example, if steel columns and beams are employed, conventional bolts 40 (FIG. 3), rivets, or welding techniques would be entirely satisfactory. If prestressed, prefabricated concrete structural elements are used, a number of variations are possible. For example, one method would be to use a holding device (not shown) in combination with extended prestressing tendons (not shown) to secure the bracket 16. Another method anticipated would be to attach anchors to brackets 14 and 16 and to embed the anchors into fresh concrete. Still another method would be the use of bolts extending from the concrete surfaces and through the brackets wherein nuts would secure the brackets thereto.

Figure 3:
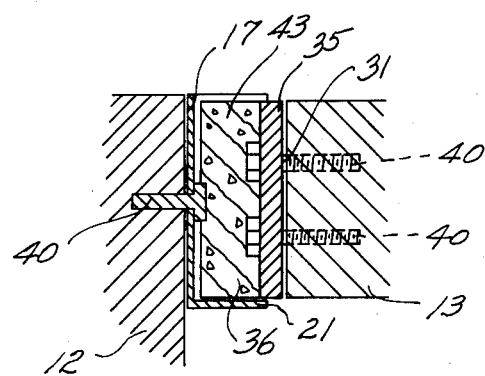
FIG. 3 is a sectional view of the apparatus taken along line 3 in FIG. 2.
Figure 4:
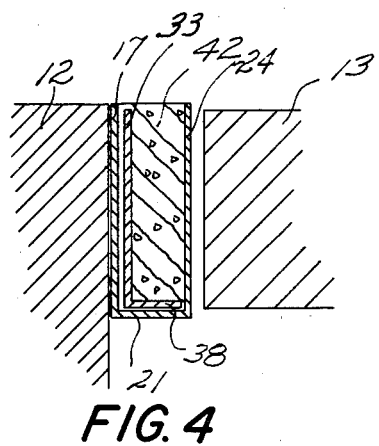
FIG. 4 is a sectional view of the apparatus taken along the line 4 in FIG. 2.

FIGS. 2-4 illustrate the interconnecting relationship between the brackets 14 and 16. The male bracket 16 slides through the open top of the female bracket 14 with the bottom surfaces of the male bracket seating on the bottom wall 21 of the female bracket. The base 35 of the male bracket 16 is disposed between the opposing sections 23 and 24 in the opening 26 with the space therebetween at a minimum. The spacer plates 38 and 39 provide and maintain space between the flanges 33 and 34 and the opposing sections 23 and 24 respectively of the front wall for all possible positions of the male bracket within the female bracket.

The spaces 44 and 45 between parts of brackets 14 and 16 are extremely important features or they provide accomodation of ordinary dimensional deviations from the planned length of beam 13 and, also, from the planned position of column 12. If the predesigned dimensional deviations are exceeded, the apparatus will not allow the connection. The invention, thus, provides a unique fail-safe system that dictates that the allowable dimensional deviations specified by the designing engineer cannot be exceeded.

The male bracket cooperates with the female bracket when seated in the latter to form a mold defined by the areas 42 and 43. After the coupling is made, the mold defined by brackets 14 and 16 is filled with grout 41. The grout material serves a number of purposes in addition to solidifying the connection.

The grout 41 fills two areas 42 and 43 and is confined therein by the walls and flanges of the two brackets. The first areas 42 are defined by the bottom wall 21 and the upper surface of the spacer plates 38 and 39, the walls 33 and 34 of the male bracket 16, the side walls 18 and 19 of the female bracket 14, the flanges 36 and 37, and the opposing sections 23 and 24 of the front wall 22. The grout 41 in the first areas prevents the beam from pulling away from the column and prevents lateral movement of the male bracket relative to the female bracket.

The second area 43 is defined by the bottom wall 21 and the rear wall 17 of the female bracket and the rear wall 32, the side walls 33 and 34 and the forward edges of the flanges 36 and 37 of the male bracket. Grouting 41 in the second area prevents the beam from moving toward the column and in combination with the grout in the first area compensates for any allowable deviation from the planned length of the beam or the planned position of the columns.

The internal recess space of brackets 14 and 16 allows clearance for nuts, bolt heads and other holding devices for affixing the brackets to their respective surfaces. Once the internal recesses are filled with grout 41, the nuts, bolts and other holding devices are effectively protected from corrosion.

"Grout" is a term of art used to indicate a thick mortar used for filling spaces. Any suitable grout may be used with the instant invention, such as a mixture of portland cement and water or other chemicals that solidify.

Figure 7:
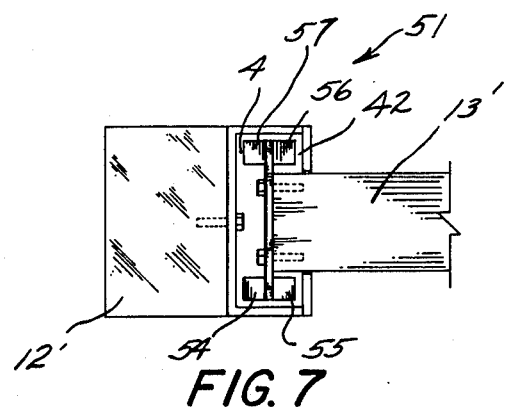
FIG. 7 is a top plan view of a modified embodiment of the apparatus wherein the grout has been left out for ease of description; and, FIG. 8 is an isometric view of the male bracket thereof.
Figure 8:
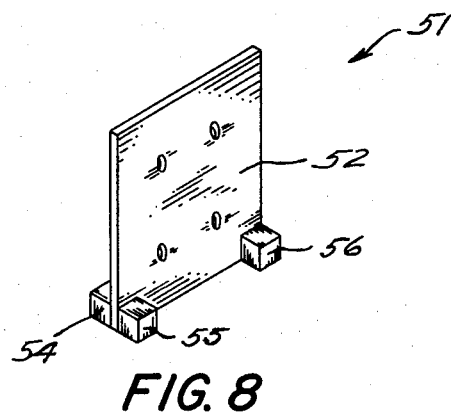

A modified embodiment of the male bracket 51 is disclosed in FIGS. 7 and 8. The bracket 51 includes a vertically disposed, plate-like member 52 affixed to the end of a beam 13' and extending laterally of the side walls thereof. Secured to the bottom edge of the member proximate the lateral edges thereof are spacer bars 54-57. The spacer bars are mounted on each side of the member and extend normally thereto. It will thus be observed that upon positioning the male bracket within the female bracket the spacer bars will provide and maintain adequate areas $42^1$ and $43^1$ for grout on both sides of the member 52 to properly lock the brackets together, compensate for any allowable dimensional deviation in length or position of the beam and column respectively, and prevent any displacement of the beam relative to the column.

It will be understood that various changes in the details, materials, steps and arrangement of parts which have herein been described and illustrated in order to explain the nature of the invention, will occur to and may be made by those skilled in the art upon a reading of the disclosure within the principles and scope of the invention.

I claim:

1. An apparatus for connecting an end of a horizontal beam to a vertical surface of supporting structure comprising:
   a female bracket for securement to the vertical surface, said female bracket being a rectangular box-like structure having an open top, a front wall having an opening formed therein which extends downward from said open top, a bottom wall, a rear wall and opposing side walls;
   a male bracket for securement to the end of the horizontal beam, and having a portion thereof projecting laterally of the beam;
   said male bracket and said female bracket being of such relative size that said male bracket will enter said female bracket open top and will seat on said bottom wall; and
   grout disposed in said female bracket on both sides of said male bracket.

2. An apparatus as defined in claim 1 including spacer means affixed to said male bracket and projecting normally thereto to provide and maintain spaces between said male bracket and said female bracket for said grout and for all possible positions of said male bracket within said female bracket.

3. An apparatus as defined in claim 1 wherein said male bracket and said female bracket cooperate when said male bracket is seated on said bottom wall of said female bracket, to form a mold to confine said grout.

4. An apparatus as defined in claim 3 including spacer means affixed to said male bracket and projecting normally thereto to provide and maintain spacer between said male bracket and said female bracket for grout and for all possible positions of said male bracket within said female bracket.

5. An apparatus for connecting an end of a horizontal beam to a vertical surface of supporting structure comprising:
   A female bracket for securement to the vertical surface, said female bracket being a rectangular box-like structure having an open top, a front wall having an opening formed therein which extends downward from said open top, a bottom wall, a rear wall and opposing side walls;
   a male bracket for securement to the end of the horizontal beam, said male bracket being a rectangular box-like structure having an open top, an open bottom, an open front, opposing side walls, a rear wall and spaced apart outwardly projecting flanges integral with said structure and disposed in a plane parallel to the plane of said open front;
   said male bracket and said female bracket being of such relative size that said male bracket will enter said female bracket only through said open top of said female bracket and seat on said bottom wall thus forming a joint between said brackets within said female bracket; and
   grout disposed in said joint.

6. An apparatus as defined in claim 5 including a spacer means affixed to each said flange and projecting in the direction of said rear wall to provide and maintain space for said grout for all possible positions of said male bracket within said female bracket.

7. An apparatus as defined in claim 3 wherein said male bracket and said female bracket cooperate when said male bracket is seated on said bottom wall of said female bracket, to form a mold to confine said grout.

8. An apparatus as defined in claim 4 including spacer means affixed to said male bracket and projecting normally thereto to provide and maintain spacer between said male bracket and said female bracket for grout and for all possible positions of said male bracket within said female bracket.

9. Method of connecting a horizontal beam to a vertical surface comprising the steps of:
   (a) providing a female bracket including a rectangular box-like structure having a top end totally open and an adjacent side with a substantially U-shaped opening therein, the open end of said U-shaped opening coinciding with said totally open side;
   (b) affixing said female bracket to the vertical surface;
   (c) providing a male bracket having a relative size to enable said male bracket to enter said female bracket open top and to leave space between said two brackets;
   (d) affixing said male bracket to the end of the horizontal beam;
   (e) connecting said male bracket to said female bracket by sliding said male bracket through the open top end of said female bracket via said U-shaped opening; and
   (f) filling the spaces between said male bracket and said female bracket with grout.

10. Method of connecting a horizontal beam to a vertical surface comprising the steps of:
    (a) providing a female bracket including a rectangular box-like structure having a top end totally open and an adjacent side with a substantially U-shaped opening therein, the open end of said U-shaped opening coinciding with said totally open side;
    (b) affixing said female bracket to the vertical surface;
    (c) providing a male bracket having spacer means affixed thereto;
    (d) affixing said male bracket to the end of the horizontal beam;
    (e) connecting said male bracket to said female bracket by sliding said male bracket through the open top end of said female bracket via said U-shaped opening with said spacer means providing spaces between said brackets; and
    (f) filling the spaces between said male bracket and said female bracket with grout.

* * * * *